TELEPHONE RINGER CIRCUIT

Filed June 22, 1962

INVENTORS M. S. HAWLEY
D. W. Mc LELLAN
BY [signature]
ATTORNEY

United States Patent Office 3,223,788
Patented Dec. 14, 1965

3,223,788
TELEPHONE RINGER CIRCUIT

Melville S. Hawley, Summit, and Donald W. McLellan, New Providence, N.J., assignors to Bell Telephone Laboratories, Incorporated, New York, N.Y., a corporation of New York Filed June 22, 1962, Ser. No. 204,433
6 Claims. (Cl. 179—84)

This invention relates to voice communication systems, and more particularly, to audio indicators for apprising subscribers to such systems of incoming calls.

The transmission of speech waves in a telephone system is generally accomplished over telephone lines comprising pairs of conductors which originate at individual station sets and are interconnected through various switching terminals. Due to the substantial dimensions of such systems it has been found virtually an economic necessity to utilize these lines not only for speech transmission, but for energizing the station ringing apparatus as well. Unfortunately, the presence of this additional equipment, whether across the line, or between a single or both conductors of the line and ground, gives rise to certain undesirable consequences.

More specifically, if only a single ringer is present on the line, as is generally the case with private line signaling, and this ringer is connected between one of the two conductors and ground, an impedance unbalance will usually exist between the various conductors of the line with respect to ground. Consequently, waves spuriously induced along both conductors of the line, for example by power transmission systems which are frequently in proximity to telephone lines, arrive at a subscriber's receiver with different magnitudes. As a result, a fluctuating potential is developed across the line which is perceptible as objectionable noise. Although this noise is conventionally eliminated by bridging the ringer across the line rather than between one conductor and ground, such an arrangement doubles the impedance of the signaling path, hence increasing markedly the signaling power requirement. In addition, such an arrangement prevents "off-hook" ringing, which could otherwise be advantageously employed to notify a subscriber that his handset is not propertly seated in its cradle.

In party line signaling, where at least one ringer is bridged between each conductor of the line and ground, objectionable noise similar to that discussed above exists owing to the impedance unbalance caused by the non-uniformity of most ringers. In practical application this difficulty is alleviated by inserting in series with the ringers one or more gas tube elements which create substantially infinite impedance between the conductors and ground, thereby virtually eliminating any unbalance which might otherwise exist. In order to operate such elements, however, sufficient unidirectional potential need be available both to ignite and to sustain conduction of gas tubes during signaling. Accordingly, although these arrangements are desirable from the standpoint of noise reduction, they are relatively costly in terms of both power consumption and the necessary power supply apparatus.

Accordingly, it is one object of the invention to reduce objectionable noise signals induced on a telephone line.

It is another object of the invention to effect telephone signaling in a more economical and efficient manner while at the same time minimizing objectionable noise.

It is another object of the invention to increase the distance over which telephone signaling may be accomplished without a corresponding increase in power consumption.

It is a further object of the invention to permit off-hook ringing to be accomplished over a private line without increasing either the noise figure or the power requirement of the station set associated with that line.

These and other objects of the invention are accomplished, broadly, by advantageously interconnecting several semiconductor switching elements to form a threshold network which exhibits an impedance characteristic particularly useful in telephone ringing apparatus. In one embodiment of the invention, an audio indicator is disposed in series with a switching network having first and second polarized switching elements, each element comprising four layers of semiconductor material arranged in succession with contiguous layers being of opposite conductivity type, and the elements being electrically interconnected in parallel in the network and poled oppositely with respect to each other.

One feature of the invention resides in a telephone ringer circuit in which a threshold network capable of translating bipolar signals is serially disposed in the loop through which the ringer is energized.

Another feature of the invention resides in the inclusion in the aforementioned threshold network of a pair of four-layer bistable semiconductor elements which remain in a high impedance condition during the application of voltages below a predetermined level, but switch rapidly to a low impedance condition as the applied voltage attempts to rise beyond that level.

Still another feature of the invention resides in the connection of the aforementioned network in series with, and intermediate, the actuating coils of a conventional telephone ringer. Such an arrangement considerably reduces high frequency current surges which might otherwise result from the rapid switching characteristic of the network, thereby substantially eliminating local radiation disturbances.

The foregoing and other objects and features of the invention will be more thoroughly understood by reference to the following detailed description of the invention in conjunction with the accompanying drawing of which:

Figure 1:
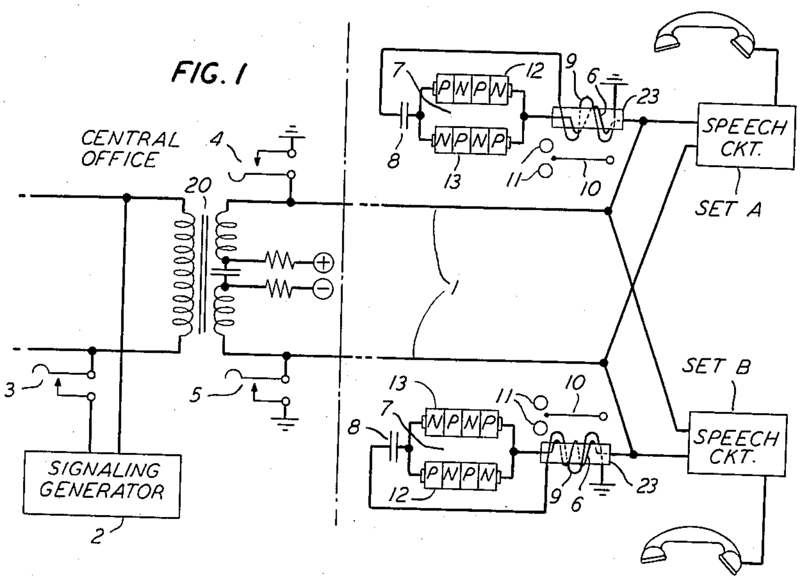
FIG. 1 illustrates the invention embodied as a telephone ringer circuit advantageously employed in a party line subscriber loop.

With reference now directed to FIG. 1 of the drawing, a party line subscriber loop is shown comprising a telephone line 1 which originates at a central office and terminates at a forked connection through which telephone sets A and B that share the loop are afforded access to the line. As is conventional in party line ringing, the sets have their own ringer structures and associated ringing circuitry which are respectively bridged between opposite conductors of the line and ground. At the central office, each loop includes a signaling generator 2 which, upon closure of a first key 3, selectively applies a 20-cycle signal to the line for actuating the ringers. A pair of keys 4 and 5 are also provided at the central office for selectively applying ground potential to either the top or bottom conductor of the line. Selective ringing is accomplished by concurrently closing key 3 and one of the other keys, either 4 or 5, associated with the conductor opposite to the one over which signaling is to proceed. For example, if it is desired to energize the ringer of set A, keys, 3 and 5 are closed so that although a 20 c.p.s. signal is applied to both conductors of the line via transformer 20, the ringer of set B is shunted by the ground path through key 5.

As shown in the drawing, the circuit of each ringer comprises a first coil 6 connected directly to a conductor of line 1, a threshold network 7, to be described in detail below, a capacitor 8 and a second coil 9 connected to ground, all of these elements being serially connected in the order recited. Coils 6 and 9, while electrically arranged in series, are physically wound in coaxial fashion on a common magnetic core 23 which serves to provide sufficient magnetic flux to vibrate clapper arm 10 between the gongs 11. One example of a ringer structure adapted to carry a pair of coaxially mounted armature coils connected in series is described in U.S. Patent 2,547,527 granted to J. R. Power on April 3, 1951.

Figure 2:
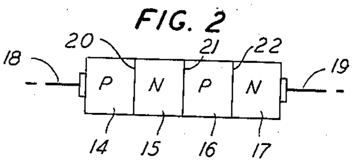
FIG. 2 is a detail diagram picturing a four layer semiconductor switching element of the general type employed in the switching network of the invention.

In the embodiment of the invention described herein, threshold networks 7 include a pair of semiconductor switching elements 12 and 13, commonly known as PNPN diodes, which are substantially identical to each other in construction. As shown in detail in FIG. 2, each diode comprises an integral body of semiconductor material, monocrystalline silicon for example, which is composed of four distinct layers arranged in succession, 14, 15, 16 and 17, respectively. Layers 14 and 16 exhibit P-type conductivity, that is to say, they are characterized by an excess of holes, or electron acceptors, and layers 15 and 17 exhibit N-type conductivity, or in other words, are characterized by an abundance of free electrons. The diodes also include a pair of terminal electrodes 18 and 19 which are respectively connected to outer layers 14 and 17, but otherwise are electrically floating. A more detailed description of PNPN diodes such as the one illustrated by FIG. 2, as well as a method for fabricating such elements, is presented in U.S. Patent 2,855,524 issued to W. Shockley on October 7, 1958.

In accordance with the invention, diodes 12 and 13 are interconnected in threshold networks 7 such that terminals 18 and 19 of one diode are respectively linked to terminals 19 and 18 of the other diode. Stating this relationship more generally, the diodes of networks 7 are effectively interconnected in parallel and oppositely poled.

Figure 3:
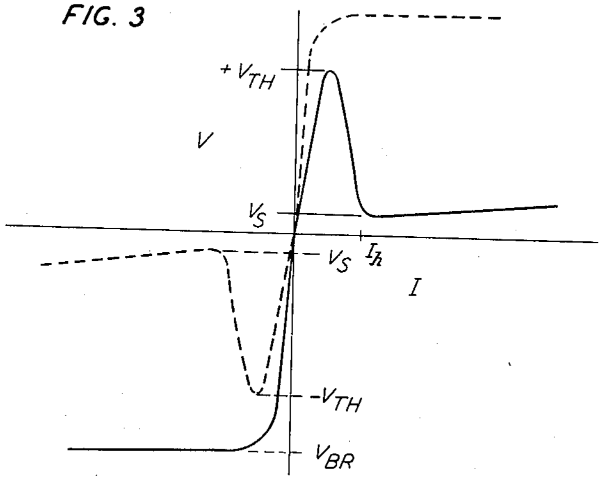
FIG. 3 depicts graphically a typical voltage-current characteristic exhibited by the type switching element illustrated in FIG. 2.

FIG. 3 illustrates in solid line a graph representing the voltage current relationship of a typical PNPN diode, the graph showing the potential of terminal 18 relative to the potential of terminal 19. It will be observed that as the voltage V increases in a positive sense toward $+V_{TH}$, the threshold level, current I through the diode increases only slightly. In this voltage range the diode exhibits an extremely high impedance, in the order of several megohms, between its terminals. During this interval the potential distribution across the diode from terminals 18 and 19 is such that junctions 20 and 22 are forward biased while junction 21 is reverse biased. As the voltage across the diode attempts to rise above $+V_{TH}$, junction 21 breaks down and the diode exhibits a negative impedance region in which the voltage between terminals 18 and 19 decreases to $V_S$, the sustaining voltage, while current increases slightly to $I_h$, the holding current. Thereafter current through the diode may increase considerably with only slight increases of voltage. Once the negative impedance region has been traversed, the diode continuously exhibits a low impedance between its terminals, 10 ohms being a typical value, so long as the current does not fall below $I_h$. If the current falls below $I_h$, the diode once again returns to its high impedance condition.

As the voltage increases in the negative direction, that is to say, the voltage of terminal 18 falls below that of terminal 19, the diode behaves as two avalanche breakdown, or Zener diodes, similarly poled and connected in series. During such an occurrence the potential distribution across the diode is such that junctions 20 and 22 are reverse biased while junction 21 is forward biased. When the breakdown potential of junctions 20 and 22 is exceeded, current through the diode increases while the voltage across its terminals remains substantially constant at $V_{BR}$, the level of reverse breakdown. For a theoretical discussion further explaining the negative impedance phenomena described above, reference is directed to Albert Van Derziel's "Solid State Physical Electronics," published in 1957 by Prentice Hall, Inc., pages 374 through 377.

The dotted line wave form in FIG. 3, in conjunction with the solid line wave form, represents a composite voltage-current characteristic of a pair of PNPN diodes connected in parallel and oppositely poled, such as the arrangement of threshold networks 7 of the present invention. It will be observed that in order to allow the diodes to alternately enter their negative impedance region, value of $V_{TH}$ is smaller than that of $V_{BR}$. Accordingly, with reference to FIG. 1, when the positive half cycles of a bipolar ringing voltage are applied to the selected switching network 7, the voltage across network 7 rises in a positive sense to the level $+V_{TH}$ and then, upon the appropriate PNPN diode being switched from a high impedance to a low impedance condition, falls to the level $V_S$. Thereafter, the voltage across the network remains substantially constant until the current through the low impedance diode falls below $I_h$, at which time the network reverts to its high impedance condition. During the other, or negative half cycles of ringing voltage, the same sequence of operation occurs except that the opposite diode switches its impedance condition and current flows in the opposite direction. It will be particularly noted that in using PNPN diodes, as herein described, the potential needed to sustain conduction is substantially below that required for impedance switching. Consequently, the use of such elements results in the consumption of substantially less power than would be required for conventional gas tubes.

The coils 6 and 9 in FIG. 1 are shown as being disposed coaxially with respect to each other. Although such an arrangement is not an absolute necessity, it has been found expedient from a manufacturing standpoint to arrange the coils in this manner. Unfortunately, this physical arrangement may in certain instances have the effect of creating a relatively large capacitance across the outer terminals of the serially combined coils. Accordingly, were switching network 7 disposed in series with but outside of the outer terminals of the coils, high frequencies generated during switching would be shunted through this large effective capacitor directly to line 1. Such an occurrence is particularly disadvantageous in that the switching time of typical PNPN diodes is extremely fast, which results in the application of radio frequency waves to line 1. It has been found that when ringing signals in the order of 80 volts are switched through a network 7 which is disposed outside of the outer terminals of coils 6 and 9, radiation from line 1 of the resulting high frequency energy is sufficient to cause noticeable disturbances in the local radio reception. This difficulty is obviated in accordance with the invention, by connecting threshold network 7 intermediate, rather than outside, coils 6 and 9. In such an arrangement the coils on either side of the network act as high frequency choke elements which suppress the aforementioned undesirable radio frequency components before their application to line 1.

To summarize the invention briefly, if spurious signals having an absolute magnitude below $V_{TH}$ are applied to both conductors of line 1, the elements of networks 7 remain in their high impedance condition and substantially prevent conduction between the conductors of line 1 and ground. Consequently, these signals arrive at the receivers of sets A and B with substantially equal magnitude so as to cancel each other, and hence considerably reduce objectionable noise. When a ringing signal having a peak voltage above $V_{TH}$ is applied to a selected conductor of the line, PNPN diodes 12 and 13 breakdown alternately and current is permitted to flow through the ringer associated with that conductor during a substantial portion of both half cycles of such ringing signal. In addition, a blocking capacitor such as 8 may be inserted in series with the ringer to prevent leakage during ringing of direct-current energy conventionally supplied by central offices for biasing the sets' transmitters. Furthermore, energization of a ringer circuit is dependent solely upon the presence of a signal having sufficient magnitude to switch diodes 12 and 13 from their high to their low impedance conditions, no high-voltage components of direct-current energy being required for this purpose.

Finally, although FIG. 1 pictures the invention in a party line signaling environment, it should also be recognized that the invention possesses aspects equally advantageous in private line signaling. More specifically, private line signaling today is generally accomplished by connecting a ringer circuit across the conductors of the line so as to alleviate the impedance unbalance which would otherwise result from a conventional ringer being connected between one conductor of the line and ground. Since the ringing circuit in such an arrangement is shunted by the relatively low impedance of the speech circuit when the handset is removed from its cradle, as is well known with those familiar with the telephone art, such an arrangement does not present itself favorably with respect to signaling a subscriber in the event that such "off-hook" condition is accidental. Accordingly, it has been found necessary to provide telephone central offices with what are commonly known as "howler" circuits which apply distinctive high voltage tones to the line to signal a subscriber through his set's receiver. Such equipment can be eliminated, however, if the ringer circuit of the invention is connected between one conductor of the line and ground. With threshold network 7 disposed in series with the ringer structure, the impedance to ground of the conductor to which the ringing circuit is connected is substantially as high as the impedance to ground of the other conductor. Consequently, spurious signals induced along both conductors of the line tend to cancel at the receiver in the same manner in which cancellation occurs in the case of party line signaling. Furthermore, with the ringer connected between a single conductor of the line and ground, the low impedance shunt path bridging the ringer during an off-hook interval is removed, thus permitting the ringer to be used for notifying a subscriber that the handset is not properly seated in its cradle.

Although only a single embodiment of the invention has been described herein, it will be apparent to those skilled in the art that numerous other arrangements and adaption may be conceived without departing from the spirit and scope of the invention.

What is claimed is:

1. Apparatus for apprising telephone subscribers of incoming calls, said apparatus comprising, in combination, a two-conductor telephone line, an audio indicator circuit coupled to said line at only a single conductor thereof, and a threshold network electrically disposed in series with said indicator circuit, first and second polarized switching elements included in said network, each of said elements comprising four distinct layers of semiconductor material arranged in succession with contiguous layers being of opposite conductivity type, and circuit means interconnecting the outer layers of said first switching element with the outer layers of said second switching element, said circuit means being such that the interconnected ones of said outer layers are of opposite conductivity type.

2. Apparatus for apprising telephone subscribers of incoming calls, said apparatus comprising, in combination, a two-conductor telephone line, an audio indicator circuit coupled to said line at only a single conductor thereof, and a threshold network electrically disposed in series with said indicator circuit, first and second switching elements included in said network, each of said elements comprising two layers of P-type semiconductor material arranged alternately with two layers of N-type semiconductor material, terminal means connecting the N-type outer layer of said first switching element with the P-type outer layer of said second switching element, and terminal means connecting the P-type outer layer of said first switching element with the N-type outer layer of said second switching element.

3. Apparatus for apprising telephone subscribers of incoming calls, said apparatus comprising, in combination, a two-conductor telephone line, an audio indicator circuit coupled to said line at only a single conductor thereof, and a threshold network electrically disposed in series with said indicator circuit, a pair of switching elements included in said network, each of said elements having a pair of terminal means disposed thereon for applying electrical signals thereto, said elements otherwise being electrically floating, the impedance of each of said elements being relatively high with respect to voltages of a preferred polarity below a predetermined level and relatively low with respect to voltages of said polarity above said level, the voltage level necessary to sustain the existence of said low impedance being substantially less than said predetermined voltage level, and means for applying voltages to the terminals of either of said elements with said preferred polarity and concomitantly said voltages to the terminals of the other of said elements with the opposite polarity.

4. Apparatus for apprising telephone subscribers of incoming calls, said apparatus comprising, in combination, a two-conductor telephone line, an audio indicator circuit coupled to said line at only a single conductor thereof, and a threshold network electrically disposed in series with said indicator circuit, first and second switching elements included in said network, said elements each comprising four layers of semiconductor material arranged in succession with contiguous layers being of opposite conductivity type, terminal means affixed to the outer layers of said elements, and linking means interconnecting said terminal means, and means including said single conductor of said telephone line to which said audio indicator circuit is coupled for applying a bipolar signal to said network, said linking means interconnecting said terminal means such that said network exhibits a negative resistance characteristic to both phases of said bipolar signal.

5. Apparatus for apprising telephone subscribers of incoming calls comprising, in combination, an electromagnetically actuated tone structure including a percussion sounder and an armature disposed in striking relation thereto, a magnetic flux circuit including a core for vibrating said armature, first and second two terminal coils coaxially wound on said core, a two terminal network which exhibits a relatively high impedance to voltages applied thereto below a predetermined level and a relatively low impedance to voltages applied thereto above said level, a capacitor disposed in series with said network, means for connecting a terminal of said first coil to a terminal of said network, means for connecting the other terminal of said first coil to a telephone line, means for connecting a terminal of said second coil to said capacitor, means for connecting the other terminal of said second coil to ground, and means including said telephone line for applying bipolar energy to said coils.

6. Apparatus in accordance with claim 5 wherein said threshold network comprises a pair of PNPN diodes, and means for interconnecting said diodes between the two terminals of said network in parallel relation and oppositely poled.

References Cited by the Examiner

UNITED STATES PATENTS

| | | | |
|---|---|---|---|
| 3,073,908 | 1/1963 | Hockgraf et al. | 179—35 |
| 3,076,871 | 2/1963 | Bauman | 179—84 X |
| 3,086,083 | 4/1963 | Feder | 307—88.5 |

ROBERT H. ROSE, *Primary Examiner.*

WALTER L. LYNDE, *Examiner.*